[11] 3,569,924

[72] Inventor Dexter Benner, Jacksonville, Fla.
[21] Appl. No. 808,513
[22] Filed Mar. 19, 1969
[45] Patented Mar. 9, 1971
[73] Assignee Dexter Manufacturing Company
Jacksonville, Fla.

[54] ULTRASONIC DETECTION SYSTEM
13 Claims, 2 Drawing Figs.
[52] U.S. Cl. ................................................. 340/16, 340/258
[51] Int. Cl. ............................................... G08b 13/16
[50] Field of Search ........................................... 340/1, 16, 15, 258 (B); 343/5 (PD)

[56] References Cited
UNITED STATES PATENTS
| 2,779,935 | 1/1957 | Loudon et al. | 340/258 |
| 2,783,459 | 2/1957 | Lienau et al. | 340/258 |
| 3,275,975 | 9/1966 | King | 340/1 |
| 3,378,834 | 4/1968 | Corbell | 343/5(PD) |

—Richard A. Farley
Attorneys—George H. Baldwin and Arthur G. Yeager

ABSTRACT: An ultrasonic detection system having a transmitter for producing a beam and receiver for receiving and converting the beam to an electrical AC signal and for amplifying the AC signal. A detector converts the amplified AC signal to a DC voltage, and a variable sensitivity control produces a voltage pulse upon a substantial change in the amplified AC signal resulting from a sufficient temporary interruption of the beam by an intruder. A relay control selectively completes the current path between a power source and a relay with the relay control being actuated upon occurrence of the voltage pulse. The variable sensitivity control includes a potentiometer for varying the bias supplied to a transistor, transistor being biased below conduction. The detector includes means for increasing the bias supplied to the transistor above conduction upon a sufficient temporary interruption of the beam by an intruder whereupon the transistor produces the voltage pulse for actuation of the relay control. The relay control includes a silicon controlled rectifier which completes the current path through the relay upon occurrence of the voltage pulse by the transistor.

Patented March 9, 1971  3,569,924

INVENTORS
Dexter Benner
John E. Drake
BY George H. Baldwin
ATTORNEY

ULTRASONIC DETECTION SYSTEM

BACKGROUND OF THE INVENTION

1. Field of the Invention

This invention relates to electronic alarm systems and more particularly to an ultrasonic detection and alarm system which is actuated by an intruder sufficiently interrupting an ultrasonic beam produced by a transmitter and received and detected by a receiver.

2. Description of the Prior Art

There have been many types of alarm systems employing sonics or ultrasonics, some utilizing the "Doppler effect" or changes in frequency between transmitted and reflected waves, others being dependent on changes in volume or pressure of the sound pattern, while others are based on amplitude shift, or frequency modulation shift or standing wave shift. Some of the various prior-art systems are exemplified by U.S. Pat. Nos. 2,071,933, 2,655,645, 2,972,133, 3,031,644, 3,047,850, 3,049,699, 3,061,829, 3,065,455, 3,074,053, 3,074,054, 3,260,991, and 3,380,044.

A problem encountered in many prior-art systems is one of "false alarming" of the alarm system, i.e., the sensitivity of the system is high and nonintruder changes often trigger the alarms of such systems. The complex and expensive nature of some of the prior-art systems is another problem area for both the manufacturer and consumer, particularly for home use. This invention is directed to an ultrasonic detection and alarm system which substantially alleviates the aforementioned difficulties in the prior-art systems as well as other inherent problems encountered therein.

SUMMARY OF THE INVENTION

The invention is directed to an ultrasonic detection system including a transmitter for producing an ultrasonic beam and a receiver for receiving and converting the beam to an electrical AC signal. Means for amplifying the AC signal and detector means for converting the amplifier AC signal to a DC voltage are provided in the receiver. Selectively controlled pulsing means produces a voltage pulse upon a sufficiently large change in the amplified AC signal resulting from a sufficient temporary interruption of the beam by an intruder. Relay means controls the activation of an alarm when the power source energizes the relay means. Selectively controlled switching means is connected in circuit with power source and relay means, switching means completing the current path through the relay means upon actuation thereof upon occurrence of the voltage pulse.

In one aspect of the invention the selectively controlled the potentiometer means includes a potentiometer and a transistor, with the potentiometer being variable to adjust the bias supplied to the transistor and biasing the transistor below conduction. The detector means includes means increasing the bias supplied to transistor above conduction upon a sufficient temporary interruption of the beam by an intruder.

In another aspect, the selectively controlled switching means includes a silicon-controlled rectifier, with the gate of the rectifier energized by the voltage pulse to cause conduction therethrough and completing the current path through the relay means. The rectifier remains actuated after being energized until the potential at the gate is drained by resetting of the system.

A general object of the invention is to provide an improved ultrasonic detection and alarm system.

A particular object is the provision of an improved system for detecting an intruder and alarming when an intruder is so detected in which spurious alarms caused by other than an intruder are substantially eliminated.

A related object is to provide an improved sensitivity control for an ultrasonic beam detection system in which minor changes in the received ultrasonic beam will not cause the system to alarm.

A specific object is the provision of an improved detection system in which the alarm continues to be actuated until the system has been reset.

Further specific objects are to provide an improved detection system which is simple and economical to manufacture and maintain, and which is readily installed and used requiring no circuit connections between the transmitter, receiver and/or remote control other than the normal wiring found in buildings and homes.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

DESCRIPTION OF THE PREFERRED EMBODIMENT

Figure 1:
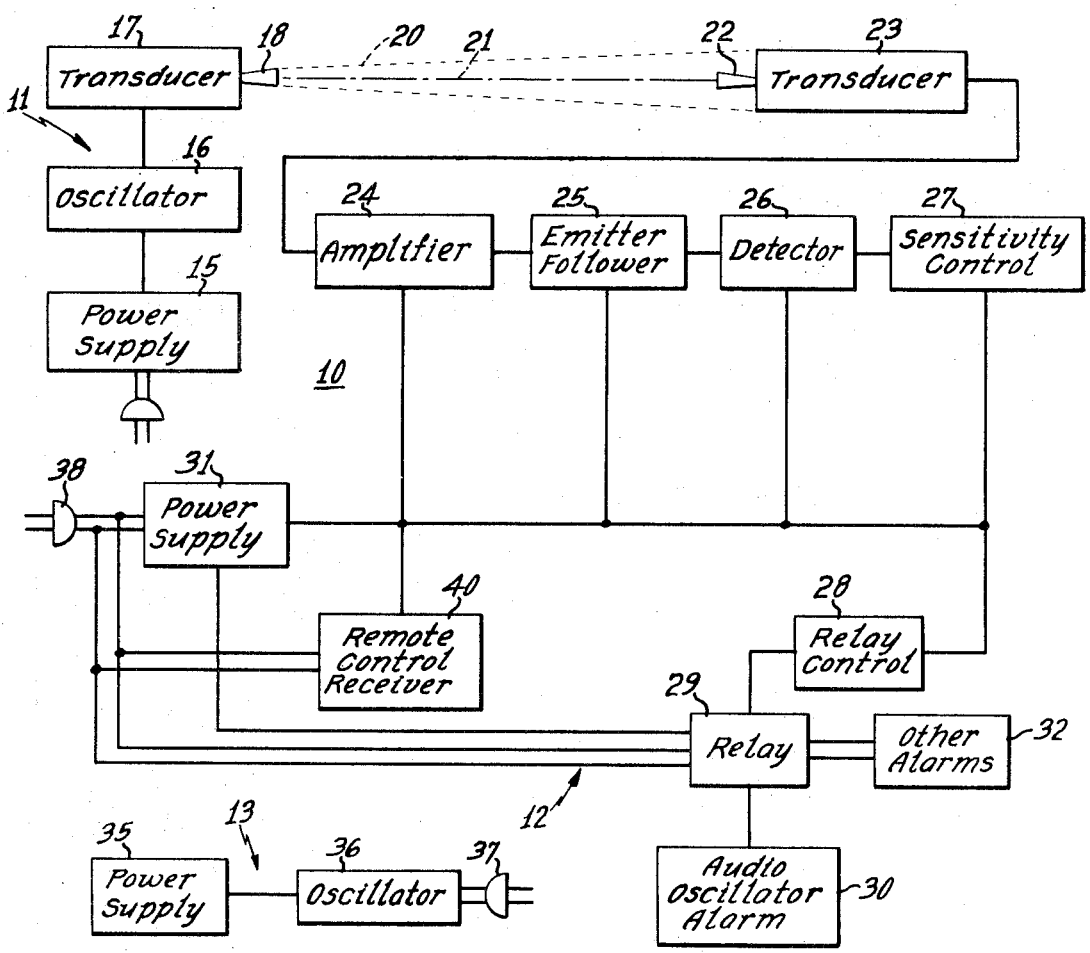
FIG. 1 is a block diagram of ultrasonic detection system and arrangement of the apparatus in accord with the invention.

Referring now more particularly to FIG. 1, the ultrasonic detection system is generally depicted at 10, and includes a transmitter 11, a receiver 12 and a remote control 13. The transmitter 11 includes a suitable power supply 15, specifically a full wave center tap supply employing silicon rectifiers, to provide a DC power source for the oscillator 16. Oscillator 16 is tuned to an appropriate frequency, for example, 40 kilocycles, which provides an output signal to drive transducer 17. The 40-kilocycle output signal is converted by the transducer 17 into an ultrasonic wave. The conical beam-shaped device 18 is mechanically coupled to transducer 17 for establishing an ultrasonic beam, shown by broken lines 20, beam 20 being generally conical in shape and of greater intensity adjacent to the cone axis 21.

The transmitter 11 may be placed on one side of a doorway, for example, and the receiver 12 may be placed on the other side, not necessarily close to the doorway, but with the transmitting cone 18 in alignment with the receiving cone 22, i.e., the cone axis being in general alignment. Cone 22 receives the central portion of ultrasonic beam 20 and causes same to be intensified therein before striking transducer 23, transducer 23 converting the received ultrasonic beam into an electrical signal. The receiving cone 22 also blocks out most of any of the reflected sound waves which are present in the room or enclosure in which the receiver 12 and transmitter 11 are located thereby rendering same less sensitive to many of the variable conditions which cause false alarms in some prior-art systems. The efficient transmission of the ultrasonic energy by cone 18 and the reception of such ultrasonic energy by cone 22 is enhanced by making the beam into a slight diverging conical shape, and the detection path which must be interrupted by an intruder is sharply delineated to a portion of the beam closely adjacent the axis 21 to inhibit false alarms in the present system.

The electrical signal from the transducer 23 is coupled to an amplifier 24, which h may include a plurality of amplifying g stages, and through an emitter follower 25 for increasing the amplitude of the signal sufficiently for later detection and control thereof. The amplifier signal is detected by detector 26 which converts the AC signal to a DC voltage which varies proportionately with the amplitude of the AC signal. The detected DC voltage is then fed into the sensitivity control 27 which can be varied to provide control over the change in the detected amplitude necessary to effect energization of the relay control 28, as hereinafter more fully describe din connection with FIG. 2.

Upon energization of relay control 28, the double-pole, double-throw relay 29 is activated and provides DC voltage to the audio oscillator alarm 30 from the power supply 31 and also connects other alarms 32, for example, a spotlight or the like, to the 110-volt AC line. The audio oscillator alarm 30 when connected to the power supply 31 by relay 29, generates a loud audible signal which varies in frequency between two different ones, these tones being achieved by a special pulsating relay circuit (not shown) in the audio oscillator 30 which intermittently varies the feedback capacitance.

The system 10 in accord with the invention preferably includes the aforementioned remote control 13. A power supply 35, in the form of a battery or the like selectively controls an oscillator 36, oscillator 36 generating a high frequency signal which is coupled to the AC line at 37. The AC line at 37 from the remote control must be in the same home or office AC line into which the receiver 12 is connected. Upon actuation of a switch (not shown) in the power supply 35, the oscillator 36 generates a high frequency signal which is fed through the AC line and is then coupled through plug 38 to remote control receiver 40, receiver 40 amplifying the high frequency signal and supplying same to a relay (not shown) therein which turns on the DC being supplied from power supply 31 to each of the amplifier 24, emitter follower 25, sensitivity control 27 and relay control 28. Another high frequency signal from the oscillator 36 will cause the relay (not shown) in receiver 40 to turn off the DC being supplied to the above units of the receiver 12.

It is to be understood that an external on-off switch may be employed for receiver 12, rather than accomplishing the on-off of the DC power for the receiver 12 in the remote control manner described with reference to remote control 13 and remote control receiver 40 without departing from the spirit and/or scope of the present invention.

After actuation of the relay 29, the receiver 12 may be reset by either removing the male plug 38 or by turning the receiver 12 off by operating remote control 13, thus causing relay 29 to drop out cutting off the audio oscillator alarm 30 and other alarms 32. The receiver 12 is then turned on again in the same manner as previously described. An automatic reset employing a time delay circuit may be incorporated into this receiver 12 which would automatically deenergize relay control 28 after a certain time interval causing relay 29 to drop out and the receiver 12 would then be reset to again alarm when the ultrasonic beam 20 is again interrupted.

Figure 2:
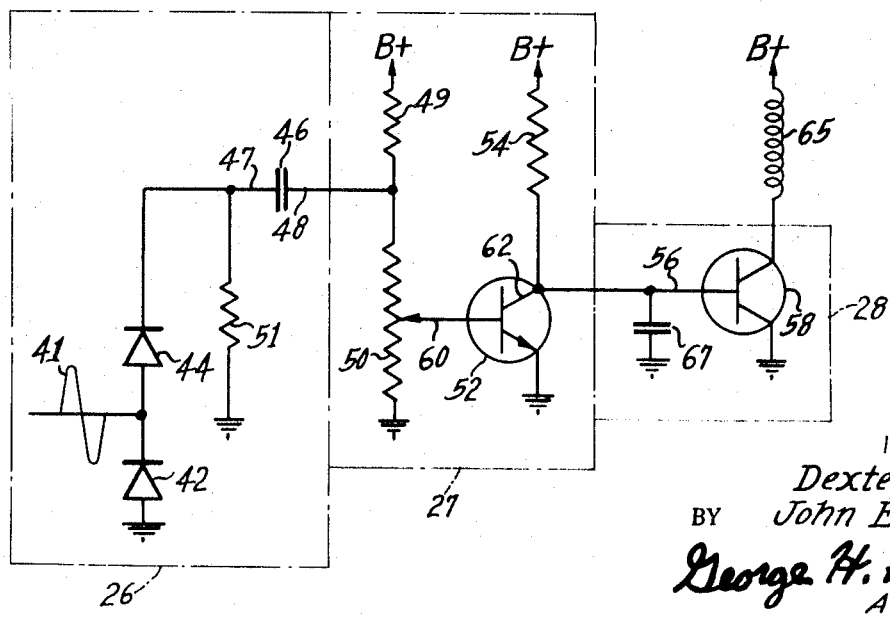
FIG. 2 is a schematic circuit diagram of the detector, sensitivity control and relay control portions of the ultrasonic detection system depicted in FIG. 1.

Referring now more particularly to FIG. 2, the amplified signal, from the receiving transducer 23, amplifier 24, and emitter follower 25, is illustrated at 41 and is coupled to detector diodes 42 and 44 which converts signal 41 to a DC voltage and charges capacitor 46, the charge on capacitor 46 being positive at 47 and a negative at 48. A variable bias supply is formed by resistor 49, connected to the B+, and potentiometer 50 for biasing the NPN transistor 52. The resistance of transistor 52 will vary from a very high resistance to a very low resistance as the bias from the B+ is increased by adjustment of the potentiometer 50. Resistor 54 of high value and transistor 52 comprise a voltage divider biasing the gate 56 of the silicon-controlled rectifier (SCR) 58. With transistor 52 biased low, its resistance will be high and a relatively large voltage passing through transistor 52 will be present at the gate 56 of SCR 58. With transistor 52 biased high, its resistance will be low and a relatively small voltage passing through transistor 52 will be present at gate 56 of SCR 58. The voltage at gate 56 of SCR 58 is directly proportional to the ratio of the resistance of resistor 54 and the resistance of transistor 52. Since the resistance of transistor 52 varies and is dependent on its bias at base 60, the potentiometer 50 can be adjusted and controlled to properly bias the transistor 52. Potentiometer 50 is normally set so that the base 60 of the transistor is at 0.6 volts and the adjustment is necessary so that the receiver 12 may properly be adjusted to conform to various conditions which change in different environments, for the system 10, for example, the distance between the transmitter 11 and receiver 12, and the air mass and normal air movement between transmitter and receiver With the base 60 at 0.6 volts, the transistor 52, connected as an emitter-follower, is not conducting in that approximately 0.7 volts is required at base 60 before transistor 52 conducts. When the AC signal 41 is interrupted by an intruder being temporarily interposed between the transmitting and receiving transducers 17 and 23 to interrupt the central portion of ultrasonic beam 20, capacitor 46 discharges and raises the potential to 0.7 volts at base 60 thereby causing current to flow through the collector 62 which raises the voltage at gate 56 of the SCR 58 to its firing level at about 0.6 volts. With the SCR 58 fired, current flows through the coil 65 which is a component of relay 29 thereby connecting the DC voltage from the power supply 31 to audio oscillator alarm 30 causing same to audibly alarm and connecting the line voltage at 38 to other alarms 32.

When resetting the system after an alarm by the use of remote control 13 which disconnects the B+ from the various components or by removing plug 38 from the line, the voltage at the gate 56 should be rapidly drained for prompt resetting of the system, this being accomplished by capacitor 67 connected between SCR gate 56 and ground.

Typical components and values of the portion of the circuit, exemplified in FIG. 2, in accord with this invention are:

| | |
|---|---|
| resistor 49 | 27,000 ohms |
| resistor 50 | 10,000 ohms |
| resistor 51 | 15,000 ohms |
| resistor 54 | 100,000 ohms |
| capacitor 46 | 100 microfarads |
| capacitor 67 | 5 microfarads |
| transistor 52 | RCA 40407 |
| SCR 58 | GE 2N 1592 |
| diodes 42 and 44 | IN 34 |

After the voltage at SCR gate 56 reaches or exceeds the firing level, the resistance of the SCR 58 is effectively reduced from its maximum to its minimum and substantially immediately causes current to flow through the coil 65 of relay 29 for connection of the audio oscillator alarm 30 to the power supply 31 and other alarms 32 to line voltage at 38.

After the AC signal has been converted to a DC voltage of sufficient amplitude to be effectively controlled, the amplitude of the DC signal becomes relatively unimportant in that the amount of change in amplitude will determine whether a firing voltage pulse will be produced to cause SCR 58 to conduct. The voltage pulse at gate 56 of SCR 58 is directly proportional to the ratio of the resistor 54 and the resistance of transistor 52. Since resistor 54 is determinate, the voltage at SCR gate 56 is proportional to the variable resistance of transistor 52. The resistance of transistor 52 has heretofore been described as being dependent on its bias, which is controlled by the potentiometer 50. The potentiometer 50 is adjusted to provide a bias on base 60 of transistor 52 at a level below the bias required to cause conduction therethrough. In this manner small changes of signal 41, which may be created by normal air turbulence, changes of humidity and the like, will have no effect toward increasing the voltage at base 60 sufficiently to cause conduction; however, relatively large change of signal 41, as would be created by intrusion of the ultrasonic beam 20 adjacent its central portion would cause capacitor 46 to discharge thereby raising the voltage at base 60 to cause conduction and ultimate actuation of the alarms 30 and 32.

The sensitivity control 27 includes a selectively controlled pulsing means comprised of transistor 52 and potentiometer 50 which actuates a switching means in the form of SCR 58 for selectively passing current through relay coil 65. The selectively controlled pulsing means is capable of discrimination of small input signal changes and large input signal changes in that such pulsing means remains inoperative during such small input signal changes. When an intruder interrupts a sufficient portion of the ultrasonic beam 20, the input signal changes substantially causing the pulsing means to produce a voltage pulse to actuate (turn on) the switching means which causes current to flow through relay coil 56 which connects the alarms for actuation.

While only a certain preferred embodiment of this invention has been shown and described by way of illustration, many modifications within the true spirit and scope of this invention and within the following claims will occur to those skilled in the art.

We claim:

1. In an ultrasonic detection system comprising an ultrasonic beam transmitter and receiver wherein the receiver includes means for receiving the ultrasonic beam and converting same to an electrical AC signal, and means for amplifying the AC signal, the improvement comprising detector means for converting the amplified AC signal to a DC voltage, a selectively controlled pulsing means for producing a voltage pulse directly proportional to the amplified AC signal upon a sufficiently large change in the amplified AC signal resulting from a sufficient temporary interruption of the ultrasonic beam by an intruder, an alarm, relay means controlling the activation of said alarm, a power source connected to said relay means, selectively controlled switching means connected to the circuit with said power source and said relay means for completing the current path through said relay means upon actuation of said switching means, said switching means being actuated upon occurrence of said voltage pulse.

2. In the system as defined in claim 1 wherein said switching means remains actuated after reestablishment of the ultrasonic beam after the temporary interruption by the intruder.

3. In the system as defined in claim 1 wherein said selectively controlled pulsing means includes a potentiometer and a transistor, a bias supply for said transistor, said potentiometer being connected to said transistor and being variable to adjust the bias being supplied to said transistor from said bias supply and biasing said transistor below conduction, said detector means including means for increasing the bias being supplied to said transistor directly proportional to the amplified AC signal to render said transistor conductive upon a sufficient temporary interruption of the ultrasonic beam by an intruder whereby the output of said transistor produces said voltage pulse for actuation of said switching means.

4. In the system as defined in claim 1 wherein said selectively controlled switching means includes a silicon controlled rectifier, said voltage pulse being sufficient to raise the potential of the gate of said rectifier to cause conduction therethrough and completing the current path through said relay means.

5. In the system as defined in claim 1 wherein said selectively controlled pulsing means includes a potentiometer and a transistor, a bias supply for said transistor, said potentiometer being connected to said transistor and being variable to adjust the bias supplied to said transistor from said bias supply and maintaining the bias of said transistor below conduction, said detector means including means for increasing the bias on said transistor proportional to the amplified AC signal to render said transistor conductive upon a sufficient interruption of the ultrasonic beam by an intruder, said selectively controlled switching means including a silicon controlled rectifier, the output of said transistor being said voltage pulse which is applied to the gate of said rectifier, said voltage pulse being sufficient to raise the potential of said rectifier gate to cause conduction therethrough and completing the current path through said relay means.

6. In an ultrasonic detection system comprising an ultrasonic beam transmitter and receiver wherein the receiver includes means for receiving the ultrasonic beam and converting same to an electrical AC signal, and means for amplifying the AC signal, the improvement comprising detector means for converting the amplified AC signal to a DC voltage, a variable sensitivity control for producing a voltage pulse directly proportional to said DC voltage upon a substantial change in the amplified AC signal resulting from a sufficient temporary interruption of the ultrasonic beam by an intruder, an alarm, a relay controlling the activation of said alarm, a power source connected to said relay, a relay control for selectively completing the current path between said power source and relay, said relay control being actuated upon occurrence of said voltage pulse.

7. In the system as defined in claim 6 wherein said relay control remains actuated after reestablishment of the ultrasonic beam after the temporary interruption by the intruder.

8. In the system as defined in claim 6 wherein said variable sensitivity control includes a potentiometer and a transistor, a bias supply for said transistor, said potentiometer being connected to said transistor and being variable to adjust the bias being supplied to said transistor from said bias supply and biasing said transistor below conduction, said detector means including means for increasing the bias being supplied to said transistor directly proportional to said DC voltage to render said transistor conductive upon a sufficient temporary interruption of the ultrasonic beam by an intruder whereby the output of said transistor produces said voltage pulse for actuation of said relay control.

9. In the system as defined in claim 6 wherein said relay control includes a silicon controlled rectifier, said voltage pulse being sufficient to raise the potential of the gate of said rectifier to cause conduction therethrough and completing the current path through said relay.

10. In the system as defined in claim 6 wherein said variable sensitivity control includes a potentiometer and a transistor, a bias supply for said transistor, said potentiometer being connected to said transistor and being variable to adjust the bias supplied to said transistor from said bias supply and maintaining the bias of said transistor below conduction, said detector means including means for increasing the bias on said transistor directly proportional to said DC voltage to render said transistor conductive upon a sufficient interruption of the ultrasonic beam by an intruder, said relay control including a silicon controlled rectifier, the output of said transistor being said voltage pulse which is applied to the gate of said rectifier, said voltage pulse being sufficient to raise the potential of said rectifier gate to cause conduction therethrough and completing the current path through said relay.

11. In the system as defined in claim 6 wherein said detector means includes a capacitor charged by said DC voltage, said sensitivity control comprising a bias supply, a transistor, a variable resistor connected between said bias supply and transistor for biasing said transistor below conduction, said capacitor discharging through said variable resistor for increasing the bias of said transistor above conduction upon a substantial change in the amplified signal resulting from a sufficient temporary interruption of the ultrasonic beam by an intruder, said transistor upon conduction supplying said voltage pulse at its output for actuation of said relay control.

12. In the system as defined in claim 11 wherein said relay control includes a silicon controlled rectifier, said sensitivity control further including a resistor connecting the gate of said rectifier to said bias supply, said transistor output being connected between said resistor and rectifier gate for supplying said voltage pulse to said gate to cause conduction therethrough and completing the current path through said power supply and relay for actuation thereof.

13. In the system as defined in claim 12 further comprising a capacitor connected between said gate and ground for draining the voltage from said gate after actuation thereof during resetting of the system and after actuation of said alarm.